(12) United States Patent
Yu

(10) Patent No.: US 8,090,129 B2
(45) Date of Patent: Jan. 3, 2012

(54) AUDIO PLAYER PLUSH

(76) Inventor: Sun Yu, Berkley, MI (US)

( * ) Notice: Subject to any disclaimer, the term of this patent is extended or adjusted under 35 U.S.C. 154(b) by 1618 days.

(21) Appl. No.: 11/349,564

(22) Filed: Feb. 8, 2006

(65) Prior Publication Data
US 2007/0185600 A1    Aug. 9, 2007

(51) Int. Cl.
*H04R 1/02* (2006.01)
*G09F 27/00* (2006.01)
*A63H 3/28* (2006.01)
*A63H 3/02* (2006.01)
*G06F 17/00* (2006.01)

(52) U.S. Cl. ........ 381/334; 381/124; 446/297; 446/369; 700/94

(58) Field of Classification Search .................. 381/333, 381/334, 124; 700/94; 446/297, 369; 5/640; 704/275; 709/217
See application file for complete search history.

(56) References Cited

U.S. PATENT DOCUMENTS

| 3,940,039 | A * | 2/1976 | Sasaki | 224/264 |
| 6,193,579 | B1 * | 2/2001 | Mak | 446/297 |
| 6,289,538 | B1 * | 9/2001 | Fidge | 5/640 |
| 7,227,965 | B1 * | 6/2007 | Sutton | 381/124 |
| 2004/0049393 | A1 * | 3/2004 | Duran et al. | 704/275 |
| 2004/0128361 | A1 * | 7/2004 | Gaffney | 709/217 |
| 2007/0042672 | A1 * | 2/2007 | Tawil | 446/369 |

* cited by examiner

*Primary Examiner* — Devona Faulk
(74) *Attorney, Agent, or Firm* — Patent Procurement Services

(57) ABSTRACT

An audio player plush includes a battery, digital memory, speaker in electrical communication with the digital memory, and a set of controls modulating speaker output associated with the digital memory. A cover bounds the digital memory and is formed of a plush fabric. A fill material within the plush fabric provides a soft surface to the audio player. A pocket is provided within the cover that is selectively closable and encompasses a digital connector for coupling the digital memory to a computer or other source of digital audio files for downloading of such files into the digital memory. When not in use, the digital connector is selectively closed within the pocket. An indicator light emitting light from the cover provides a user with a visual signal indicative of the activation state of the digital memory.

11 Claims, 3 Drawing Sheets

AUDIO PLAYER PLUSH

FIELD OF THE INVENTION

The present invention in general relates to an audio player and in particular to an audio player having a plush cover.

BACKGROUND OF THE INVENTION

Considerable content exists for young children in the form of music and stories. Delivery of audio content to young children has presented a problem in that an inquisitive young child tends to damage through usage the audio player components and storage media such as a cassette tape or compact disc. MP format players are more robust than other types of players towards mishandling by a child, yet a danger persists as to a child being hit or otherwise injured by the hard surfaces of a conventional MP format player. While stuffed animals have previously been constructed that incorporate a cassette player, such toys have proven to remain susceptible to user damage and remain a safety risk owing to exposed hard surfaces associated with the controls and cassette access door.

Thus, there exists a need for a plush audio player resistant to damage caused by small children and safe for a small child to operate independent of adult supervision.

SUMMARY OF THE INVENTION

An audio player plush includes a battery, digital memory, speaker in electrical communication with the digital memory, and a set of controls modulating speaker output associated with the digital memory. A cover bounds the digital memory and is formed of a plush fabric. A fill material within the plush fabric provides a soft surface to the audio player. A pocket is provided within the cover that is selectively closable and encompasses a digital connector for coupling the digital memory to a computer or other source of digital audio files for downloading of such files into the digital memory. When not in use, the digital connector is selectively closed within the pocket. An indicator light emitting light from the cover provides a user with a visual signal indicative of the activation state of the digital memory.

In order to accommodate a conventional hard surface digital audio player, a plush is provided that incorporates a speaker in electrical communication with a speaker wire that in turn terminates in a speaker plug. The speaker plug extends into a pocket formed within a fabric cover packed with a plush fill material. The pocket within the volume of the cover is accessible through an aperture in the cover and dimensioned to accommodate a conventional digital audio player. Upon energizing a conventional digital audio player and connecting the player to the speaker plug, the digital player is inserted within the pocket to provide audio output through the speaker without resort to an earphone or headsets.

DETAILED DESCRIPTION OF THE PREFERRED EMBODIMENTS

The present invention has utility as a protective covering for an audio player that while well suited for a number of use circumstances is particularly advantageous in facilitating operation of a digital audio player by a child. A plush covering internalizing an audio player not only protects the audio player from mishandling but also protects a user from injury associated with hard surface contact with the internalized audio player.

Figure 1:
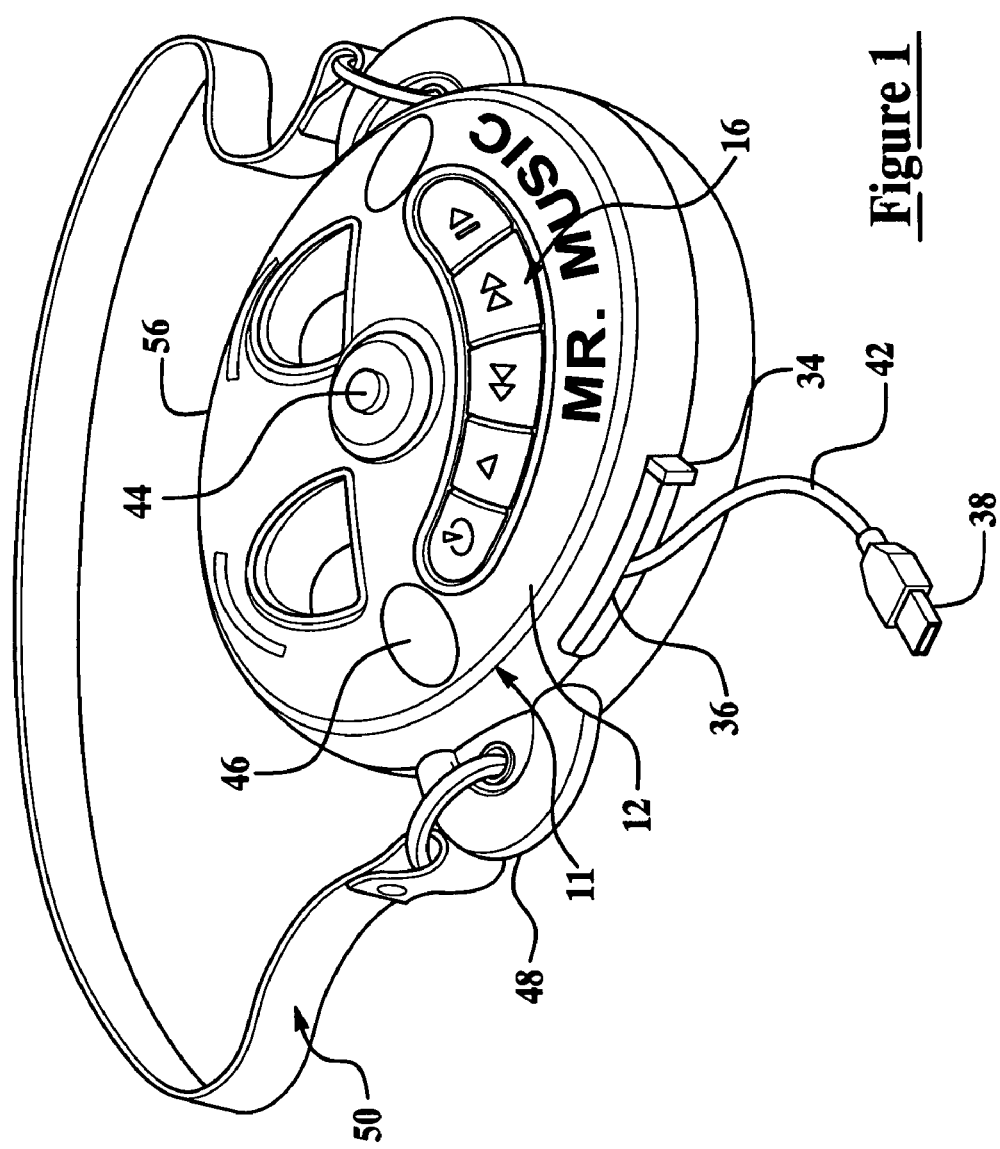
FIG. 1 is a perspective view of an inventive audio player plush.

Referring now to FIG. 1, a perspective view of an inventive player plush is shown in FIG. 1 generally at 10. A cover 11 has a fabric skin 12 sewn or otherwise fused to contain a plush fill material 13 such as cotton fiber, urethane foam, styrenic beads or the like. The fabric skin 12 is appreciated to be provided with a variety of naps and textures as a matter of design choice. In a particular embodiment, the fabric skin 12 and the fill 13 are both polyester materials.

A digital audio player is incorporated within the volume defined by the cover 11. Digital audio formats operative herein are MPEG audio layer 3 (MP3) and 4 (MP4), ITUNESS, wave (WAV), windows media audio (WMA), real audio (RA), and audio video interleave (AVI). A set of control buttons are collectively shown at 16 extended to the exterior of the cover 11. The control buttons 16 include one or more control functions such as power on-off, volume control, fast forward, reverse, play, and next track. The control buttons 16 are preferably contact switches stitched into position underlying the fabric skin 12. In an alternate embodiment a pocket is formed within the cover 10 surface and the switch secured therein.

The cover 11 includes an aperture 34. The aperture 34 selectively is closed with resort to a closure 35 illustratively including a zipper, a hook-and-loop fastener, eyelets, and buttons. The aperture 34 provides an opening to a pocket 36. The pocket 36 houses a connector 38 in electrical communication with the digital audio player 26. Representative of the various conventional connectors is a universal serial bus (USB) connector. Optionally, the pocket 36 also affords service access to the digital audio player 26. Service access to the internal digital audio player 26 is for purposes such as replacement of a battery 40 or repair of a connection between the player 26 and a lead 24 or a lead 42 extending between the connector 38 and the player 26.

In a preferred embodiment, an indicator light 44 extends from the cover 11 to provide a user with a visual signal that the inventive audio player is energized. While any number of conventional light sources are operative herein as indicator light 44, a light emitting diode (LED) represents a preferred form for the indicator light 44. Upon a digital audio player 26 being energized and placed in a "play" functional mode, sound is emitted from one or more speakers 46 stitched into the cover 11. Preferably, the one or more speakers 46 are sufficiently recessed and/or overlayered with fabric alone or in combination with fill so as to retain a soft, pillow-like compressiveness in the vicinity of speakers 46. Optionally, a securement 48 is provided extending from the cover 11 to facilitate anchoring of a strap shown generally at 50. The cover 11 is also amenable to receiving printed indicia 52 through a silk screening or other conventional process. The cover 11 is also amenable to the addition of further simulative or decorative features in the form of embroidery 56.

Figure 2A:
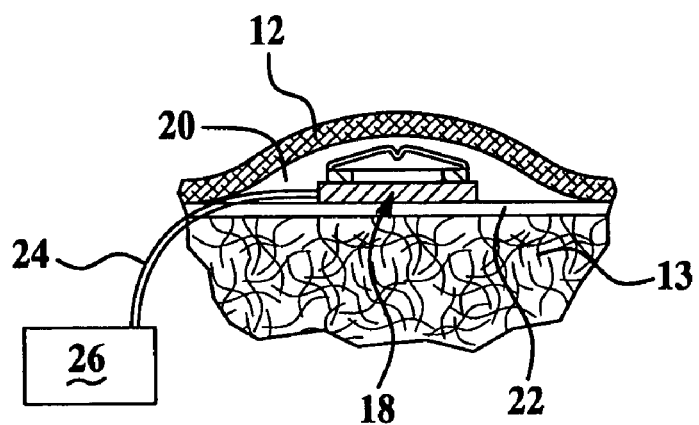
FIG. 2A is a cross-sectional view of an audio player button within the audio player plush of FIG. 1.
Figure 2B:
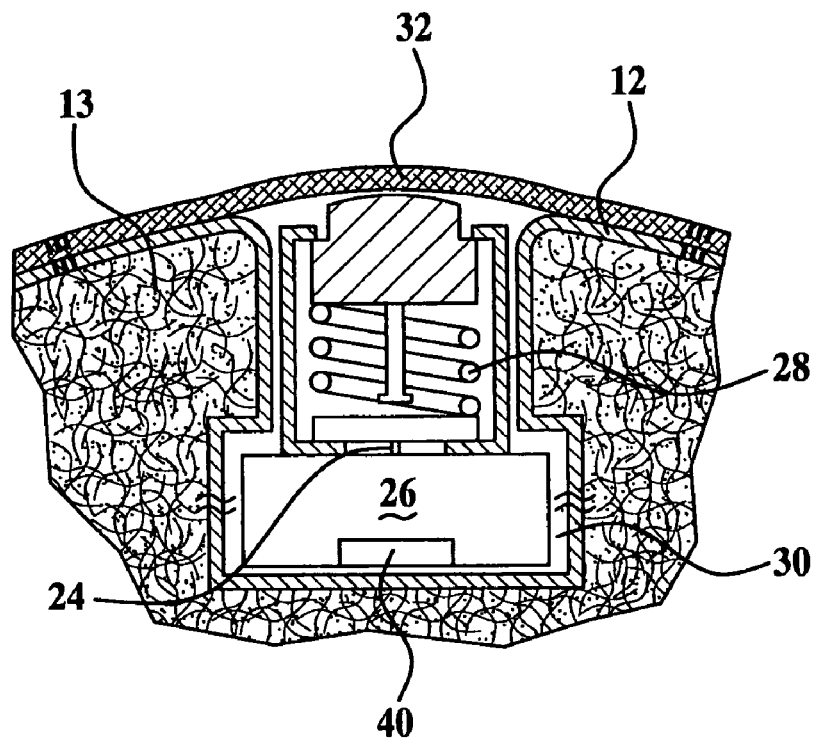
FIG. 2B is a cross-sectional view of an alternate embodiment of a control button located within the audio player of FIG. 1.

As best seen in FIG. 2A, where alternate control button retention structures are shown in cross view, a switch 18 is sewn into a pocket 20 defined by the fabric skin 12 and an underlying fabric layer 22. Fill 13 is optionally placed within the pocket 20 with leads 24 extending from the switch 18 in electrical communication with the digital audio player 26. In an alternate embodiment shown in FIG. 2B, a switch shown generally at 28 is rigidly affixed to the digital audio player 26 and extends through from a pocket 30 bounding a digital audio player 26. Optionally, an additional layer of fabric 36 is secured to the fabric skin 12 defining the pocket 30 so as to overlie the switch 28. Optionally, fill 13 is inserted intermediate between the additional fabric layer 32 and the switch 28 to afford a degree of padding.

Figure 3:
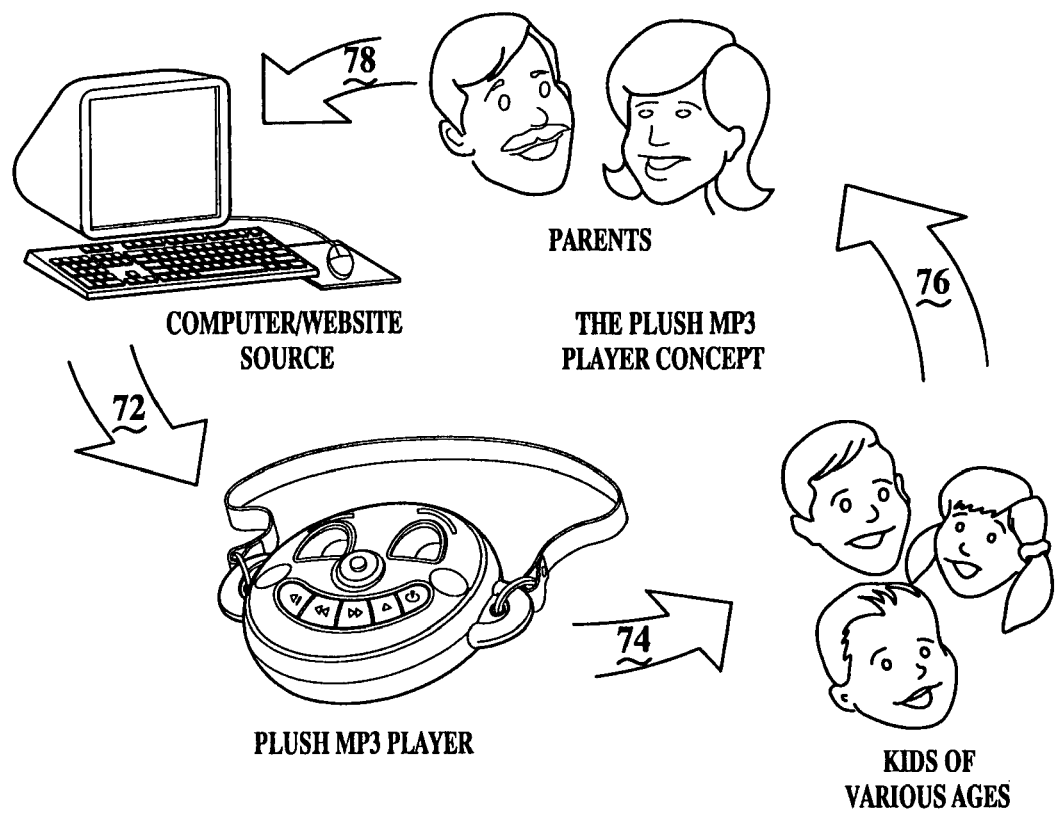
FIG. 3 is a schematic illustrating the operative steps in using an audio player plush of FIG. 1.

The operation of an audio player according to the present invention to protect such a player from a child user is depicted schematically in FIG. 3. The digital download connector 38 is coupled to a computer or website source and digital audio files are downloaded into the inventive player at step 72. The inventive audio player is then played by a user, especially a small child user, at step 74. A child user then indicates to a parent or adult that additional audio programming content is desired at step 76. The parent or adult then locates the desired audio content within a computer or a website source accessed through the computer at step 78. An audio player usable by a small child without adult or parental intervention is thereby provided.

Figure 4:
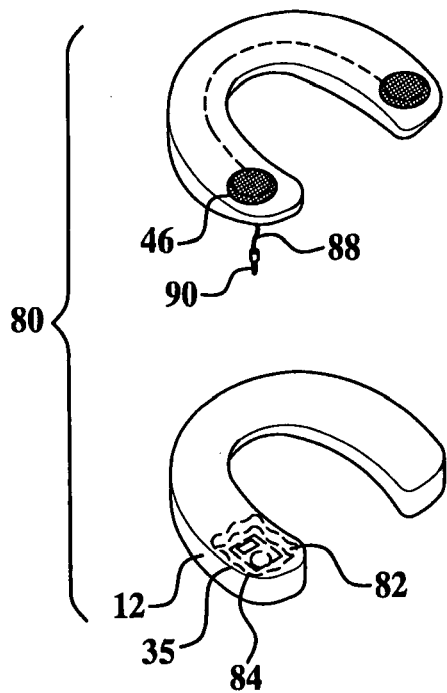
FIG. 4 is an exploded view of an alternate audio player plush according to the present invention adapted to operate with a conventional audio player.

It is appreciated that an inventive plush is also operative to house a freestanding, conventional digital audio player. Referring now to FIG. 4, an exploded view of an inventive plush is shown generally at 80 where like numerals correspond to those referenced with respect to FIGS. 1 and 2. The cover 80 is formed by stitching or otherwise securing a fabric skin 12 to define a volume. The volume of the cover 80 encloses fill material 13. A pocket 82 is formed on the surface of the cover 80 or within the cover volume and bounded by fill 13. The pocket 82 is dimensioned to receive a conventional portable digital player or digital FM tuner (shown in ghost). An aperture 84 provides access to the pocket 82 with the edges of the aperture 84 selectively closed through inclusion of a closure 35. The cover 80 also includes one or more speakers 46 secured therein. A set of control buttons 89 are sewn into the cover 80 and are electrically coupled to the speaker 46 by speaker wire 88. The control buttons are conventional digital audio player control functions of "forward", "reverse", "on/off" and optionally a volume control. The speaker wire 88 extends from the at least one speaker 46 and the set of control buttons 89 to terminate in a speaker plug 90 located within the pocket 82. Preferably, when the cover 80 is in the form of a cervical pillow, two speakers 46 are diametrically positioned. An alternative cover form is appreciated to be that of a conventional rectilinear pillow, although there is no limit as to the cover shape.

In operation, a user who wishes to listen to audio content while resting, unencumbered by a headset or speaker earpiece, places a portable digital audio player into the pocket 82, connects the digital audio player to speaker plug 90, and energizes the audio player. The audio player is retained within the pocket 82 and retained therein through deployment of the closure 35. A user manipulates the set of controls 89 to listen to audio output played through the at least one speaker 46.

The foregoing description is illustrative of particular embodiments of the invention, but is not meant to be a limitation upon the practice thereof. The following claims, including all equivalents thereof, are intended to define the scope of the invention.

The invention claimed is:

1. A digital audio player plush comprising:
   a battery;
   a digital memory in a format selected from the group consisting of: MPEG audio layer 3, MPEG audio layer 4, ITUNES®, wave, windows media audio, real audio, and audio video interleave;
   a speaker in electrical communication with said digital memory;
   a cover bounding said digital memory within a volume defined by said cover;
   a set of control buttons sewn into said cover, said set of control buttons are electrically coupled to said speaker and modulating speaker output associated with said digital memory and communicating a user input across said cover to said digital memory;
   digital USB data connector coupled to said digital memory and accessed through said cover; and
   a fill material within said cover and surrounding said digital memory to protect a user from injury associated with hard surface contact with said digital memory, said speaker overlayed by said cover and said fill to provide a pillow-like compressiveness proximal to said speaker.

2. The plush of claim 1 further comprising a pocket formed in said fill, said pocket selectively closed through use of a closure.

3. The plush of claim 2 further comprising a digital data connector coupled to said digital memory and stored within said pocket.

4. The plush of claim 3 wherein said digital connector is in a USB format.

5. The plush of claim 1 further comprising an indicator light signaling a use state of said digital memory.

6. The plush of claim 5 wherein said indicator light is a light emitting diode.

7. The plush of claim 2 wherein said pocket has an opening affording service access to said digital memory.

8. The plush of claim 1 wherein fabric overlies said set of controls.

9. The plush of claim 1 wherein said set of controls are recessed within said cover absent a fabric overlayer thereon.

10. The plush of claim 1 wherein said fill and said cover are both polyester.

11. The plush of claim 1 further comprising a securement adapted to secure a strap to said cover.

* * * * *